Feb. 22, 1955     J. L. JOHNSTON     2,702,474
WELL TESTING DEVICE
Filed Sept. 10, 1948     3 Sheets-Sheet 1

INVENTOR.
James L. Johnston
BY
Attorneys.

Feb. 22, 1955   J. L. JOHNSTON   2,702,474
WELL TESTING DEVICE
Filed Sept. 10, 1948   3 Sheets-Sheet 2

INVENTOR.
James L. Johnston
BY
Attorneys.

Feb. 22, 1955    J. L. JOHNSTON    2,702,474
WELL TESTING DEVICE
Filed Sept. 10, 1948    3 Sheets-Sheet 3

INVENTOR.
James L. Johnston
BY

Attorneys.

United States Patent Office 2,702,474
Patented Feb. 22, 1955

2,702,474

WELL TESTING DEVICE

James L. Johnston, Longview, Tex., assignor of one-fourth to Madge Johnston, one-twelfth to E. C. Johnston, Jr., one-twelfth to Gordon C. Johnston, one-twelfth to J. Glenn Johnston, one-fourth to Mordica O. Johnston, one-eighth to Mordica O. Johnston, Jr., and one-eighth to Warren C. Johnston Application September 10, 1948, Serial No. 48,721

14 Claims. (Cl. 73—152)

This invention relates to a combination fluid and pressure tester of a light weight construction which is adaptable to be inserted into the bore of a well to seal off the well at any desired point to measure the flowing pressure at that point, and the device is also adaptable to measure the pressure in a "rathole" or sealed off portion of a well.

The device relates also to an invention which has an application in measuring hydrostatic pressures as it is lowered into the well, and it is also adapted to permit pressures in a sealed off portion of the well to force fluids upward through the device to the top of the well to be sampled.

It is an object of this invention to provide a combination fluid and pressure tester which can be lowered to any point in a casing or well bore to grasp and seal off the well below such point, after which the device is operable to permit fluids from the sealed off well portion to flow upwardly around, as well as into, a testing bomb in the mandrel assembly of the tester so that the flowing pressures of the fluids may be measured.

It is also an object of this invention to provide a tester of this class which may have a spacer insertable in the mandrel assembly so that fluids are sealed off from flowing around the testing bomb, with the result that the fluid pressures measured by the testing bomb are those pressures in the sealed off portion of the well.

It is a further object of this invention to provide a combination fluid and pressure tester having a mandrel assembly which can be pulled up to the top of the well to observe recordings taken by the tester bomb thereof, and then readily lowered back into position in the tester body so that further recordings may be taken.

It is also an object of this invention to provide a tester of this class so adapted that the mandrel assembly including testing bomb, may be used for testing purposes in a casing, drill string, or tubing, independently of whether or not the well therebelow may be sealed off by means of a packer unit.

It is a further object of this invention to provide a tester of this class for assembly with the drill string or tubing of a well bore, the tester being provided with a mandrel assembly containing testing bomb, seal and valve which may be withdrawn from the well by a wire line, thereby leaving the well in completed state with unrestricted flow passage provided therethrough.

It is yet another object of this invention to provide a tester of this class of much lighter construction than present apparatus used for testing, and having a mandrel assembly, containing testing bomb, which assembly may be retrieved by a wire line whereas existing heavier equipment has to be retrieved by withdrawing from the well all of the pipe of the drill string or tubing with which the tester has been used.

It is a further object of this invention to provide a tester of this class in which the mandrel assembly may be raised to the top of the well, a spacer installed therein to maintain the seal or valve in sealing location when in position, the stem removed therefrom, and the mandrel assembly then re-lowered to a latched position within the tubing or casing above the sealed off well bore, so that bottom hole pressures may be recorded.

It is also an object of this invention to provide a tester of this class in which a hydrostatic bailer may be inserted in the mandrel assembly thereof in place of the tester bomb, so that a sample of fluid may be obtained thereby when the tester is lowered to position in the casing, drill string or tubing.

It is a further object of this invention to provide a tester of this class in which a trap may be inserted in the mandrel assembly below the tester bomb, so that a sample of fluid may be obtained thereby when the tester is lowered to position into the drill string or tubing.

It is also an object of this invention to provide a tester of this class in which a latch on the mandrel contacts an internal shoulder of the tester body to limit the upward passage of the mandrel when the mandrel has been released by the lowering of the body, the latch being retractable so that the mandrel containing the testing bomb sealing means and valve may be pulled upward from out of the tester body and out of the well by a wire line.

It is also a further object of this invention to provide a tester of this class which is adaptable to measure hydrostatic pressures as it is lowered into the well.

It is a further object of this invention to provide a tester of this class which may be used after the manner of a conventional tester and lowered into the well on the end of a tubing string to measure flowing pressures as it is lowered, and then to seal off the well at any desired location to measure the sealed off pressures below that point, after which the tubing string with the tester attached may be withdrawn from the well so that the tester recordings may be observed.

Other and further objects of the invention will be more fully apparent from the following description considered in connection with the drawings, in which.

Figures 1, 2:
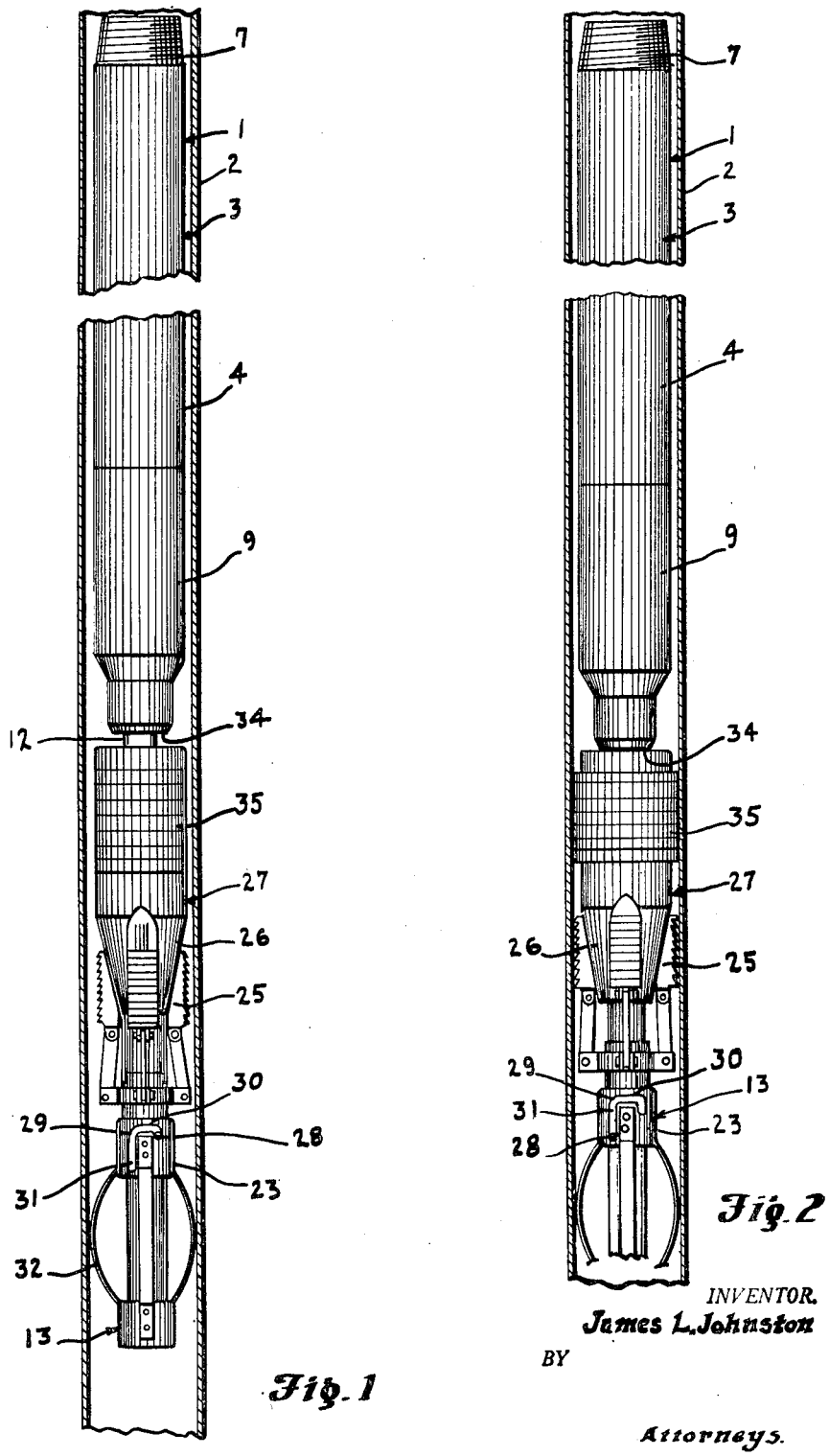
Fig. 1 is a sectional elevation through the well casing which shows the tester before the packer has been expanded to seal off the well bore.
Fig. 2 is a sectional view through the casing which shows the tester after the packer has been expanded to seal off the casing or well bore.
Figure 3:
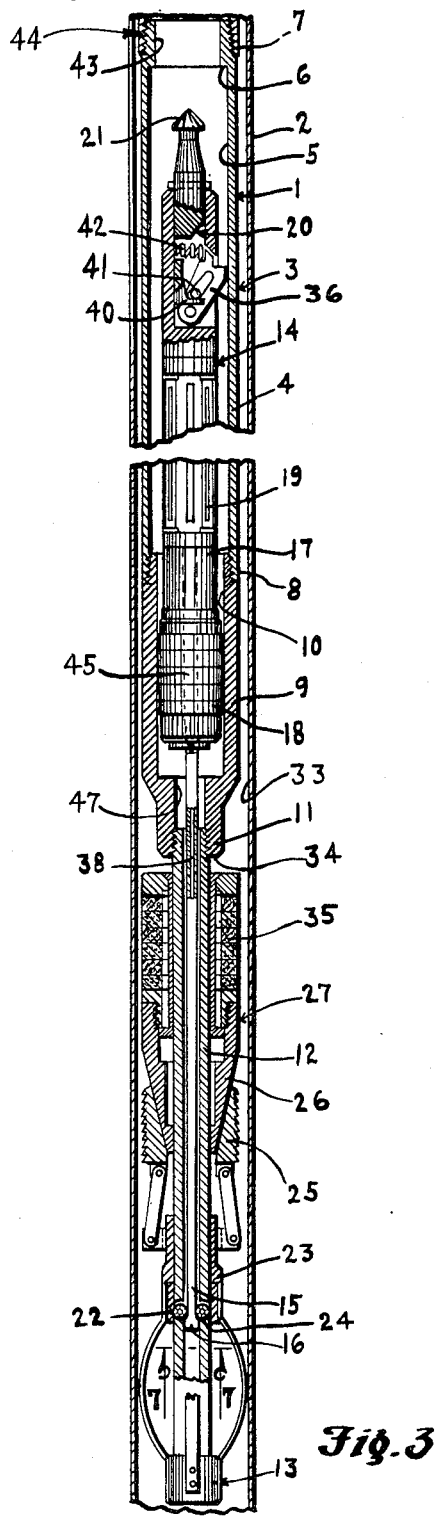
Fig. 3 is a sectional elevation through the casing and through the tester which shows the tester in the well in position described in Fig. 1.

The tester 1 is assembled in position at the top of the well and is lowered into the casing 2 to any desired level therein as is shown in Figs. 1 and 3.

The tester body 3 comprises a tube 4 which has a counterbore 5 terminating in a shoulder 6 at the upper end thereof and which terminates upwardly in an externally threaded section 7 to be received in the lower tool joint of a drill string assembly 44 or in any similar tubular assembly by means of which the tester is lowered into the well. The tube 4 has an internally threaded section 8 at the lower end thereof to receive a lower section 9 which has a counterbore 10 therein and which has an internally threaded section 11 to receive a pipe 12 which has a cage or spring unit 13 on the end thereof and rigidly fixed thereto.

A mandrel assembly 14 is operable in the tester body 3. This assembly terminates downwardly in a stem 15 which has a flange 16 at the end thereof and which is threaded into the body of the mandrel 17 which operates in the counterbores 5 and 10. The mandrel has therearound a seal 18 interposed between the mandrel and the counterbore 10 so that the lower part of the tester body is sealed off from the upper part. Above the seal 18 there is inserted into the mandrel assembly the testing bomb 19 of any well-known construction, as disclosed in detail in my Patent No. 2,223,913 and as generally disclosed in Patent No. 2,189,919 to T. V. Moore. Above the bomb 19 the mandrel terminates in the latching mechanism 20 and in the spear head pull bar 21 which is adapted to be engaged by a wire line, not shown.

The pipe 12 has concavities 24 therein into which latching balls 22 are fitted. When the tester is assembled to be lowered into the well the balls 22 are fitted over flange 16 of the stem 15 to thereby restrain the mandrel from being forced upwardly by the well pressures. This is accomplished since the sleeve 23 fits around the pipe 12 and the concavities 24 therein to force the balls inwardly against the upper part of flange 16. A set of slip jaws 25, of any well-known construction, is attached to the sleeve 23 and these jaws are operably attached to section 26 of packer assembly 27, also of any well-known construction.

The pipe 12 has lug 28 thereon which works in a J-slot 29 in the sleeve 23 of the cage unit 13. When the tester is in the well at any desired position the drilling string assembly by which the tester is lowered is rotated so that the lug passes along the horizontally extending leg 30 of the J-slot until it is above the vertical leg 31. Then the drill string 44 to which the tester is attached is slackened off from the top of the well to force the end face 34 of the lower tester body section 9 downwardly to expand the sealing elements 35 of the packer assembly 27 against the inner walls 33 of the casing 2, or of a well bore, to thus seal off the upper portion of the well from the lower part thereof. This downward movement also forces the packer assembly 27 to spread the slip jaws 25 outwardly to grasp the sides of the casing wall 33 and thus securely position the tester body 3 against further vertical movement.

When the drill string 44 is slackened off to move the tester body 3 downwardly the lug 28 moves to the bottom of the vertical leg 31 of the J-slot 29, and the sleeve 23 moves out of contact with the concavities 24 in the pipe 12. Then the pressures in the well force upwardly on the stem flange 16 to force the balls out into the position shown in Fig. 4, thereby unlatching the stem and freeing the mandrel assembly 14 for upward movement in response to well pressures.

When this is done the mandrel moves up until the latch 36 of the latching mechanism 20 contacts the shoulder 6 of the tube 4. As the result of this motion, the seal 18 around the mandrel passes outwardly out of the counterbore 10 into the counterbore 5, and when this is done the well fluids flow upwardly through the slots 37 in the flange 16 as well as upwardly through the passage 38 of the hollow stem 15 so that the testing bomb 19 measures the pressure of fluids flowing in this section of the well.

Figure 5:
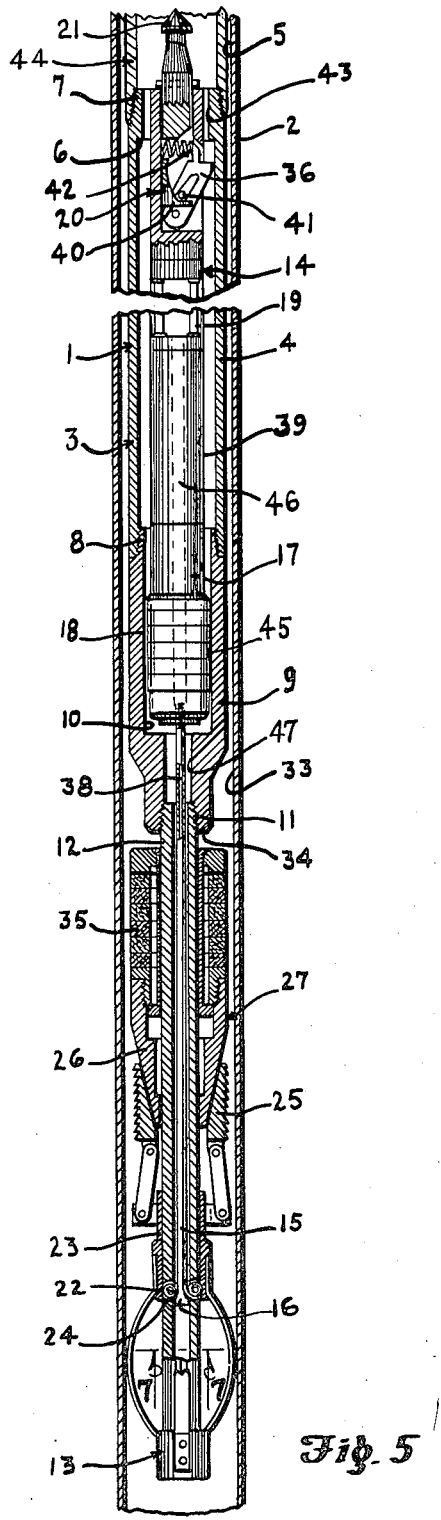
Fig. 5 is a sectional elevation through the casing and through the tester to show a spacer inserted in the mandrel between the seal and tester bomb.
Figure 6:
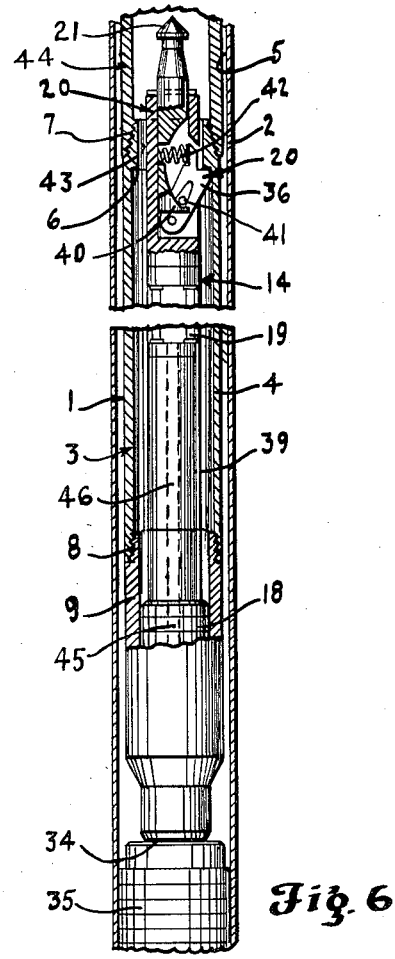
Fig. 6 is a sectional elevation through the casing to show how, with a spacer inserted in the mandrel assembly, the seal between mandrel and tester body may still remain in sealing position after the mandrel has been released for upward passage into latched position.
Figure 7:
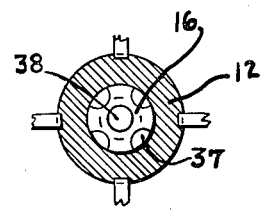
Fig. 7 is a sectional view through the mandrel stem and tester body pipe which shows the slots in the stem flange which permit liquid to flow upwardly therethrough into the upper tester body.

In the tester assembly, shown in Figs. 5 and 6, a spacer 39 is provided in the mandrel assembly 17 between the testing bomb 19 and the seal 18 so that when the mandrel is unlatched for upward passage to the upwardly latched position shown in Fig. 6, the seal 18 still remains in the counterbore 10 when the lower section of the well is sealed off. It then results that the only access to the testing bomb 19 is through the passage 38 in the stem 15 and this results in the testing bomb 19 measuring the pressures of the fluids in the sealed off portion of the well.

At this point it can be mentioned that this optional mandrel assembly which includes the spacer is not necessarily limited to the construction shown in Figs. 5 and 6, but it can be a matter of choice as to whether the spacer 39 is inserted therein between the seal 18 and bomb 19, or between the bomb 19 and latching mechanism 20.

When it is desirable to pull the mandrel assembly 17 from the well so as to observe the recordings of the tester bomb 19, the wire line, not shown, which is attached to the spear head pull bar 21, is pulled upwardly so that the tongue 40 of the latching mechanism 20 pulls upwardly on the lug 41 to force the latch 36 inwardly against the outward force of the spring 42 so that the latch passes inwardly out of communication with the shoulder 6 to permit the mandrel assembly 17 to be pulled through the bore 43 in the tube 4.

It is obvious that as the tester 1 is lowered into the well, well fluids pass upward through the passage 38 of the stem 15 so that the testing bomb 19 may continuously record hydrostatic pressures in all of the increasingly deeper well levels of the downward passage.

Figure 4:
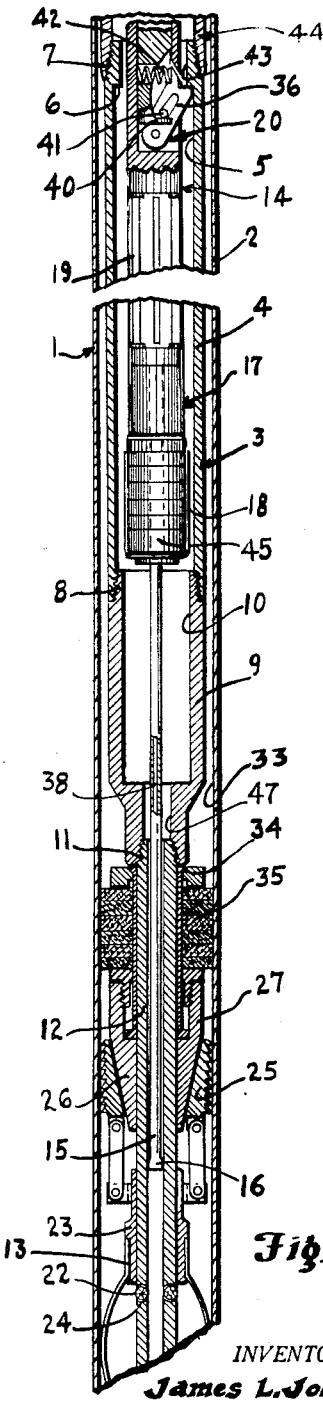
Fig. 4 is a sectional elevation through the casing and through the tester which shows the tester in the position in the well described in Fig. 2.

It is pointed out that with the tester in position shown in Fig. 4, fluids from the sealed off portion of the well may flow upwardly through the slots 37, around the seal 18, to the top of the well where samples thereof may be taken.

It should be noted that when the spacer 39 is installed, and with the latch 20 in latched position as shown in Fig. 6, there will be no necessity for the stem 15 to be incorporated in the mandrel assembly 14, especially when bottom hole pressures are to be recorded. In this case all that is necessary is to lower the drill string or tubing 44, with the tester 1 assembled thereon, into position in the well. Then, referring to Fig. 5, the fluids will pass up inside pipe 12, through bore 45 of seal 18 and bore 46 of spacer 39, to communicate with the interior of testing bomb 19, so that the pressures of these fluids will be recorded by the testing bomb.

If it should be desirable to run this tool in the well without a packer, then on occasion even the pipe 12 could be removed and, with the drill string or tubing assembly 44 in position, and containing the mandrel in the latched position of Fig. 6, then referring to Fig. 5, fluids would pass into the bore 47 and counterbore 10 of the tester 1, and thence through seal bore 45 and spacer bore 46 into the interior of testing bomb 19.

It is also possible to take trapped samples of fluids by inserting a conventional hydrostatic bailer, not shown in any drawing, in place of the testing bomb 19. Such a bailer is described in U. S. Patent No. 2,418,500. Then, with the seal 18 in sealing position in the counterbore 10, as shown in Fig. 6, the fluids will pass through the seal bore 45 and spacer bore 46, and thence into the bailer for entrapment. After this mandrel assembly 14 may be withdrawn by a wire line and the sample taken from the bailer.

It is also possible to obtain fluid samples by the general method described in the above paragraph, but with a conventional fluid trap, not shown in any drawing, inserted in place of the spacer 39, whereas in the above paragraph the hydrostatic bailer has been described as being substituted for the testing bomb 19. A suitable fluid trap is described in U. S. Patent No. 2,316,216.

The ease with which a mandrel assembly 14 may be replaced lends to the flexibility of uses of this invention, as after observation it may be replaced by simply lowering it on a wire line until it is at a level in the tester body 3 to permit the spring 42 to force the latch 36 under the shoulder 6, thereby latching the mandrel assembly 14 within the tester body. If the spacer 39 is incorporated in the mandrel assembly, so that the seal 18 is in the counterbore 10, then the bomb will be back in position to measure bottom hole pressures.

If, as hereinabove described, a hydrostatic bailer of the usual form or any fluid trap is inserted in place of the bomb, a trapped sample may be obtained.

Also, as hereinabove described, when the mandrel assembly 14 of Figs. 3 and 4, in which the spacer 19 is omitted, has been returned back into latching position within the tester body 3, the bomb therein will record the flowing pressure at that level.

This invention broadly contemplates the provision of a combination fluid pressure tester, and sampler, comprising a compact assembly of light weight parts which may be carried into the oil fields as a unit and attached to any drill string or tubing assembly which may be lowered into any cased well or uncased well bore.

The combination of structures incorporated in this invention includes a mandrel or internal assembly of testing bombs, fluid traps, and in each case a seal operable in a valve element. Such internal assembly is retractable from the well by a wire line. This combination admits of many and diverse uses of this equipment. The provision of a packing structure at the lower end of the unit further multiplies its usages.

It is also possible to use this invention in the manner of a conventional tester, such as the tester disclosed in Patent No. 2,189,919 to T. V. Moore. This adaptation can be made, as hereinabove described, by inserting the spacer 39 in the mandrel assembly so that the seal 18 remains in the counterbore 10 when the mandrel is latched. Then the drill or tubing string 44 containing the tester assembly may be lowered into the well, and the packer or sealing element assembly 35 expanded to seal off the well therebelow. After this, the whole tubing string 44 may be raised to release the packer 35, and further raised out of the well so that the recordings of the tester bomb assembly may be observed.

It is, therefore, pointed out that this invention is not limited to the objects hereinbefore stated, but the invention additionally relates to other applications of the structures disclosed and to other methods of testing, sampling, and packing off sections of a well, to which these structures are obviously adapted.

What is claimed is:

1. A well testing device, comprising, a tubular body insertable in a well having coaxial bores of different diameters extending longitudinally through said body, the upper bore being larger in diameter than the lower bore, a hollow mandrel longitudinally slidable in said bores, an annular sealing element mounted about the exterior of the mandrel to seal off the lower bore from the upper bore, a well-fluid testing element mounted in said mandrel above the sealing element, said body having an opening providing communication between the well and the lower bore below the sealing element, the mandrel having a passageway providing communication between said testing element and the lower bore below said sealing element, and retractable latch means mounted on the mandrel engageable with the body to limit upward movement of the mandrel in the body, said latch means being retractable to release said mandrel for withdrawal from said body.

2. A well testing device as defined in claim 1, wherein said well fluid testing element is a well pressure bomb.

3. A well testing device as defined in claim 1, wherein said well fluid testing element is a hydrostatic bailer.

4. A well testing device as defined in claim 1, wherein said well fluid testing unit is a well fluid trap.

5. A well testing device, comprising, a tubular body insertable in a well having co-axial bores of different diameters extending longitudinally through said body, the upper bore being larger in diameter than the lower bore, a hollow mandrel longitudinally slidable in said bores, an annular sealing element mounted about the exterior of the mandrel to seal off the lower bore from the upper bore and withdrawable upwardly from the lower bore by upward movement of the mandrel in the body, a well-fluid testing element mounted in the mandrel above the sealing element, said body having an opening providing communication between the well and the lower bore below the sealing element, the mandrel having a passageway providing communication between said testing element and the lower bore below the sealing element, and retractable latch means mounted on the mandrel engageable with the body when the sealing element is withdrawn from the lower bore to limit said upward movement of the mandrel, said latch means being retractable to release said mandrel for withdrawal from said body.

6. A well testing device as defined by claim 5, wherein said well-fluid testing element is a well pressure bomb.

7. A well testing device as defined by claim 5, wherein said well-fluid testing element is a hydrostatic bailer.

8. A well testing device as defined by claim 5, wherein said well-fluid testing element is a well fluid trap.

9. A well testing device, comprising, a tubular body insertable in a well having co-axial bores of different diameters extending longitudinally through said body, the upper bore being larger in diameter than the lower bore, a hollow mandrel longitudinally slidable in said bores, an annular sealing element mounted about the exterior of the mandrel to seal off the lower bore from the upper bore, a well-fluid testing element mounted in the mandrel above the sealing element, said body having an opening providing communication between the well and the lower bore below the sealing element, the mandrel having a passageway providing communication between said testing element and the lower bore below the sealing element, retractable latch means mounted on the mandrel engageable with the body to limit upward movement of the mandrel in the body, said latch means being retractable to release said mandrel for withdrawal from said body, an expansible packer supported by the body and positioned to seal off a portion of the well below the packer from that above the packer, said opening extending through the packer to provide communication between the interior of said body and the portion of the well below the packer.

10. A well testing device as defined in claim 9, wherein said well-fluid testing element is a well pressure bomb.

11. A well testing device as defined by claim 9, wherein said well-fluid testing element is a hydrostatic bailer.

12. A well testing device as defined by claim 9, wherein said well-fluid testing element is a well fluid trap.

13. A well testing device, comprising, a tubular body insertable in a well having co-axial bores of different diameters extending longitudinally through said body, the upper bore being larger in diameter than the lower bore, a hollow mandrel longitudinally slidable in said bores, an annular sealing element mounted about the exterior of the mandrel to seal off the lower bore from the upper bore and withdrawable upwardly from the lower bore by upward movement of the mandrel in the body, a well-fluid testing element mounted in the mandrel above the sealing element, said body having an axial opening in the lower end thereof providing communication between the well and the lower bore below the sealing element, said mandrel having a passageway providing communication between said testing element and the lower bore below the sealing element, retractable latch means mounted on the mandrel engageable with the body when the sealing element is withdrawn from the lower bore to limit said upward movement of the mandrel, said latch means being retractable to release said mandrel for withdrawal from said body, a tubular extension connected to said body in communication with said axial opening and extending below the body, and an expansible well packer slidably mounted on said extension, said packer being actuated by relative movement of said body to seal off a portion of the well below the packer from that above the packer, the lower end of said extension being in open communication with the portion of the well below the packer.

14. A well testing device as defined by claim 13 which includes a tubular stem slidable longitudinally through the bore of said extension, the upper end of said stem being connected to the mandrel in communication with said passageway below the sealing element, the lower end of said stem communicating with the portion of the well below the packer, and a second latch means releasably connecting said stem to said extension, said second latch means being actuatable by longitudinal movement of said body relative to said packer to release said stem for upward movement in said extension.

References Cited in the file of this patent

UNITED STATES PATENTS

| | | |
|---|---|---|
| 1,955,855 | Marx | Apr. 24, 1934 |
| 2,189,919 | Moore | Feb. 13, 1940 |
| 2,217,038 | Alley | Oct. 8, 1940 |
| 2,222,829 | Hamason et al. | Nov. 26, 1940 |
| 2,313,176 | Shelby | Mar. 9, 1943 |
| 2,316,216 | Bandy | Apr. 13, 1943 |
| 2,389,512 | Hamason | Nov. 20, 1945 |
| 2,404,825 | Brown et al. | July 30, 1946 |
| 2,418,500 | Chambers | Apr. 8, 1947 |